(12) United States Patent
Su et al.

(10) Patent No.: US 10,575,143 B2
(45) Date of Patent: Feb. 25, 2020

(54) PORTABLE ELECTRONIC DEVICE AND METHOD OF CONTROLLING A SECONDARY FEATURE

(71) Applicant: MOTOROLA SOLUTIONS, INC., Chicago, IL (US)

(72) Inventors: Qiao Su, Sichuan (CN); Haiqing Hu, Sichuan (CN); Yonggang Wan, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/324,709

(22) PCT Filed: Aug. 18, 2016

(86) PCT No.: PCT/CN2016/095886
§ 371 (c)(1),
(2) Date: Feb. 11, 2019

(87) PCT Pub. No.: WO2018/032470
PCT Pub. Date: Feb. 22, 2018

(65) Prior Publication Data
US 2019/0222973 A1     Jul. 18, 2019

(51) Int. Cl.
*H04W 4/10* (2009.01)
*G06F 21/74* (2013.01)
(Continued)

(52) U.S. Cl.
CPC .............. *H04W 4/10* (2013.01); *G06F 3/048* (2013.01); *G06F 3/04817* (2013.01);
(Continued)

(58) Field of Classification Search
CPC ........................... H04M 1/725; G06F 3/04817
(Continued)

(56) References Cited

U.S. PATENT DOCUMENTS 8,364,129 B1    1/2013  Beyer, Jr.
9,288,639 B2    3/2016  Kerger et al.
(Continued)

FOREIGN PATENT DOCUMENTS

CN    104145471    12/2014

OTHER PUBLICATIONS

PCT/CN2016/095886 International Search Report and Written Opinion of the International Searching Authority dated Mar. 8, 2017 (11 pages).
Australian 1st Examination Report dated Nov. 6, 2019 for corresponding Australian Application No. 2016419920.
Korean Office Action dated Dec. 16, 2019 for corresponding Korean Application No. 10-2019-7007389.

*Primary Examiner* — Kiet M Doan
(74) *Attorney, Agent, or Firm* — Michael Best & Friedrich LLP

(57) ABSTRACT

Portable electronic device (105) and method (400) of controlling a secondary feature. In one example, the portable electronic device (105) includes a transceiver (230), a touch-screen display (225) displaying a push-to-talk button (305), and an electronic processor (205). The electronic processor (205) is configured to start transmitting a push-to-talk communication when the push-to-talk button (305) is selected. The electronic processor (205) is also configured to display a secondary feature button (320) on the touch-screen display (225) while the push-to-talk button (305) remains selected. The electronic processor (205) is further configured to detect a swipe motion (325) on the touch-screen display (225) from the push-to-talk button 305 to the secondary feature button (320). The electronic processor (205) is also configured to initiate a secondary feature, in response to the swipe motion (325) being detected, while continuing to transmit the push-to-talk communication.

18 Claims, 9 Drawing Sheets

(51) Int. Cl.
*G06F 3/0488* (2013.01)
*H04M 1/725* (2006.01)
*G06F 3/0481* (2013.01)
*G06F 3/048* (2013.01)
*H04W 4/16* (2009.01)
*H04M 1/656* (2006.01)

(52) U.S. Cl.
CPC .......... *G06F 3/04883* (2013.01); *G06F 21/74* (2013.01); *H04M 1/72519* (2013.01); *H04M 1/72583* (2013.01); *H04M 1/656* (2013.01); *H04M 1/72555* (2013.01); *H04M 2250/22* (2013.01); *H04W 4/16* (2013.01)

(58) Field of Classification Search
USPC ........... 345/540, 404.2, 156, 173; 455/404.2, 455/404.1, 411, 573, 550.1, 414.1, 518, 455/575.1
See application file for complete search history.

(56) References Cited

U.S. PATENT DOCUMENTS

| | | | | |
|---|---|---|---|---|
| 2010/0066677 | A1* | 3/2010 | Garrett | G06F 1/1626 345/163 |
| 2010/0137027 | A1* | 6/2010 | Kim | G06F 3/03547 455/556.1 |
| 2013/0109425 | A1 | 5/2013 | Kerger et al. | |
| 2013/0225118 | A1* | 8/2013 | Jang | H04W 4/90 455/404.2 |
| 2013/0231049 | A1 | 9/2013 | Sharma et al. | |
| 2014/0098749 | A9 | 4/2014 | McNamara et al. | |
| 2014/0215336 | A1 | 7/2014 | Gardenfors et al. | |
| 2016/0041684 | A1* | 2/2016 | Rhee | G06F 3/0416 345/173 |
| 2016/0165032 | A1* | 6/2016 | Chang | H04L 67/142 455/566 |

* cited by examiner

PORTABLE ELECTRONIC DEVICE AND METHOD OF CONTROLLING A SECONDARY FEATURE

BACKGROUND OF THE INVENTION

Push-to-talk is a communication technique used by two or more communication devices to exchange information. Push-to-talk communications may include the exchange of audio over a half-duplex operating channel. For example, each communication device includes a button to switch from a voice reception mode to a transmit mode. In the voice reception mode, a communication device receives audio from other communication devices over an operating channel. In the transmit mode, the communication device transmits audio over the operating channel for receipt by other communication devices. Some communication devices include a dedicated physical push-to-talk button. Other, communication devices instead include a push-to-talk button on a touch-screen display. To maintain the communication device in the transmit mode, a user may need to continue to depress the push-to-talk button.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
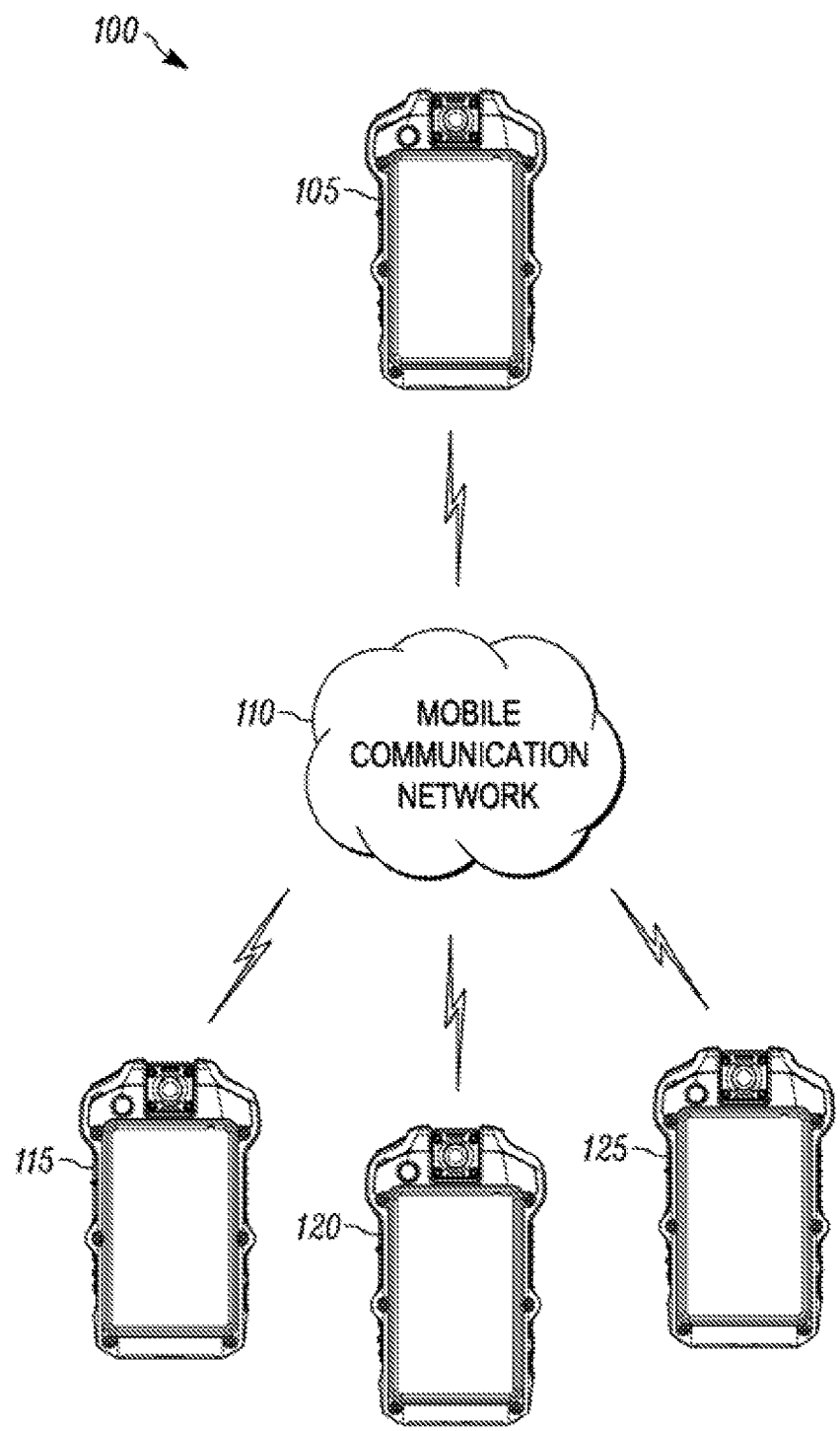
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a portable electronic device that communicates with other portable electronic devices within a mobile communication network. In one example, the portable electronic device includes a transceiver, a touch-screen display, and an electronic processor. The touch-screen display displays a push-to-talk button. The electronic processor is electrically coupled to the transceiver and the touch-screen display. The electronic processor is configured to start transmitting a push-to-talk communication via the transceiver on a current operating channel to at least one other portable electronic device within the mobile communication network when the push-to-talk button is selected. The electronic processor is also configured to display a secondary feature button on the touch-screen display while the push-to-talk button remains selected. The electronic processor is further configured to detect a swipe motion on the touch-screen display from the push-to-talk button to the secondary feature button. The electronic processor is also configured to initiate a secondary feature, in response to the swipe motion being detected, while continuing to transmit the push-to-talk communication on the current operating channel.

Another embodiment provides a method of controlling a secondary feature on a portable electronic device that communicates with other portable electronic devices within a mobile communication network. In one example, the method includes displaying a push-to-talk button on a touch-screen display of the portable electronic device. The method also includes starting transmitting a push-to-talk communication via a transceiver of the portable electronic device on a current operating channel to at least one other portable electronic device within the mobile communication network when the push-to-talk button is selected. The method further includes displaying a secondary feature button on the touch-screen display while the push-to-talk button remains selected. The method also includes detecting a swipe motion on the touch-screen display from the push-to-talk button to the secondary feature button. The method further includes initiating the secondary feature, in response to the swipe motion being detected, while continuing to transmit the push-to-talk communication on the current operating channel.

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a diagram of one exemplary embodiment of a communication system 100. The communication system 100 includes a portable electronic device 105, a mobile communication network 110, and a plurality of other portable electronic devices 115, 120, and 125. The mobile communication network 110 may be a wired network, a wireless network, or both. All or parts of the mobile communication network 110 may be implemented using various networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The portable electronic device 105 and the plurality of other portable electronic devices 115 through 125 communicate with each other over the mobile communication network 110 using suitable wireless or wired communication protocols. In some embodiments, communications with other external devices (not shown) occur over the mobile communication network 110.

In the example illustrated, the portable electronic device 105 is a body-worn camera, for example, one of the Motorola® Si series of video speaker microphones. In alternative embodiments, the portable electronic device 105 may be a handheld communication device (for example, a mobile telephone, a portable two-way radio, or other portable communication device), a smart watch or other smart wearable, or other electronic device capable of communicating over the mobile communication network 110 using push-to-talk communication.

Figure 2:
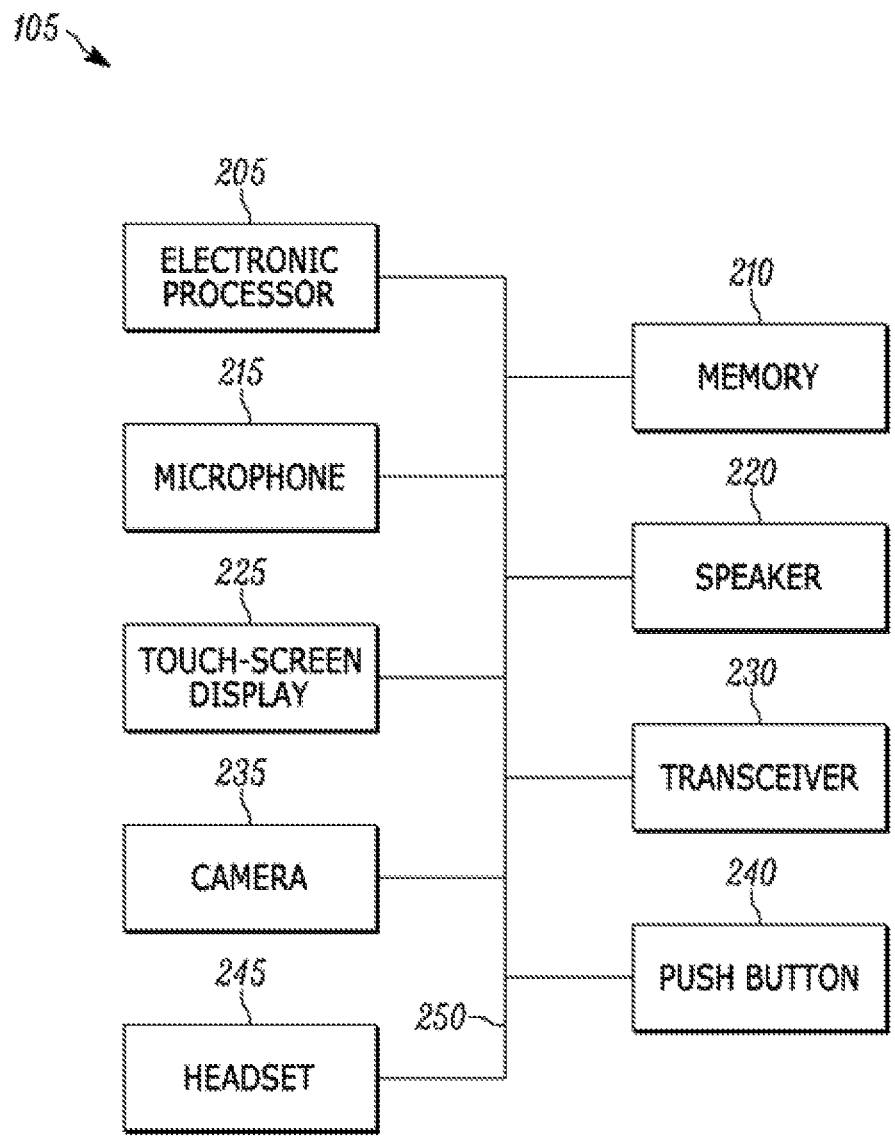
FIG. 2 is a diagram of a portable electronic device in accordance with some embodiments.

FIG. 2 is a diagram of one exemplary embodiment of the portable electronic device 105. In the embodiment illustrated, the portable electronic device 105 includes an electronic processor 205 (for example, a microprocessor, or other electronic controller), a memory 210, a microphone 215, a speaker 220, a touch-screen display 225, a transceiver 230, a camera 235, a push button 240, and a headset 245. The electronic processor 205, the memory 210, as well as the other various modules are coupled by a bus 250, or are coupled directly, by one or more additional control or data buses, or a combination thereof.

The memory 210 may include read only memory (ROM), random access memory (RAM), other non-transitory computer-readable media, or a combination thereof. The electronic processor 205 is configured to retrieve instructions and data from the memory 210 and execute, among other things, instructions to perform the methods described herein.

The touch-screen display 225 is a touch-sensitive interface that displays visual output, for example, webpages and other graphical user interfaces (GUIs) generated by software applications executed by the electronic processor 205. The touch-screen display 225 also receives user input using detected physical contact, for example, detected capacitance or resistance. Based on the user input, the touch-screen display 225 outputs signals to the electronic processor 205 which indicate positions on the touch-screen display 225 currently being selected by physical contact. In some embodiments, the touch-screen display 225 includes a liquid crystal display (LCD).

The transceiver 230 establishes push-to-talk communication via the mobile communication network 110. In some embodiments, the transceiver 230 transmits and receives audio data over a half-duplex operating channel, (for example, over a two-way radio network, and the like). In other embodiments, the transceiver 230 transmits and receives audio data over a full-duplex operating channel. For example, in some embodiments, the transceiver 230 transmits and receives half-duplex communication (for example, push-to-talk communication) over a full-duplex operating channel (for example, using push-to-talk over cellular, push-to-talk over broadband, or simulated half-duplex over full-duplex). When transmitting push-to-talk communication, the transceiver 230 initially receives audio data through the microphone 215 and transmits the received audio data over a data communication network. Similarly, when receiving push-to-talk communication, the transceiver 230 outputs the received audio data through the speaker 220. In some embodiments, the transceiver 230 includes a separate transmitter and receiver.

The camera 235 includes one or more optical sensors that capture optical signals. For example, the camera 235 may include charged-coupled devices (CCDs) that capture an image, a series of images, video, and the like.

The push button 240 includes a physical button that, when selected, transmits an electrical signal to the electronic processor 205. Upon receiving the electrical signal, the electronic processor 205 performs one or more operations on the portable electronic device 105. For example, in some embodiments, the electronic processor 205 turns the portable electronic device 105 on or off when the push button 240 is selected. As a further example, in some embodiments, the electronic processor 205 turns the touch-screen display 225 on or off when the push button 240 is selected.

The headset 245 includes a separate microphone and speaker (not shown). The headset 245 provides an additional or alternate device to capture audio for transmitting push-to-talk communication, and to output audio in received push-to-talk communication. In some embodiments, the headset 245 communicates with the electronic processor 205 via the bus 250, as shown, or via a wireless communication network (for example, a Bluetooth™ network). In the alternate embodiments, the headset 245 communicates with the electronic processor 205 via any suitable wireless or wired communication network, such as those discussed above in relation to the mobile communication network 110.

The electronic processor 205 can perform one or more secondary features while transmitting push-to-talk communication. Some secondary features are not associated with push-to-talk communication and are available at any time. As an example, one secondary feature includes recording some or all of the audio communication that the electronic processor 205 is currently receiving via the transceiver 230. Other secondary features are associated with push-to-talk communication and are available during a push-to-talk call. As an example, one secondary feature includes transmitting video, captured by the camera 235, along with audio in a push-to-talk communication.

Figure 3A:
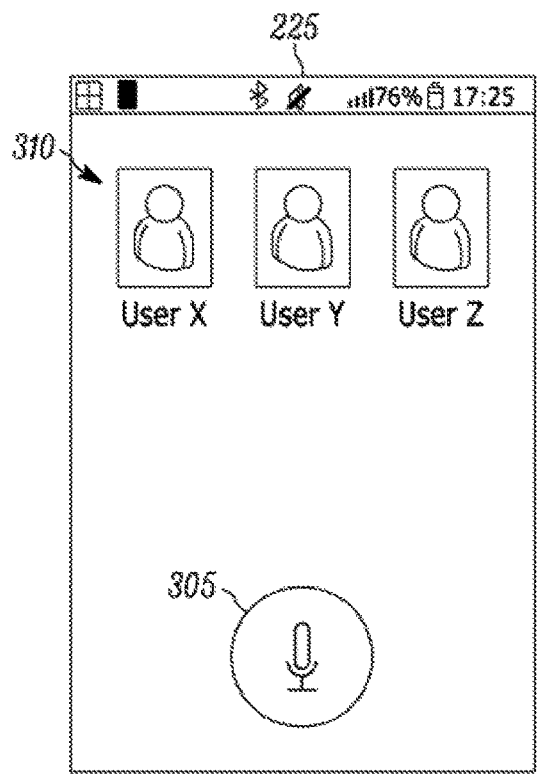
FIGS. 3A through 3D are exemplary screen shots of a touch-screen display including a secondary feature button.
Figure 3B:
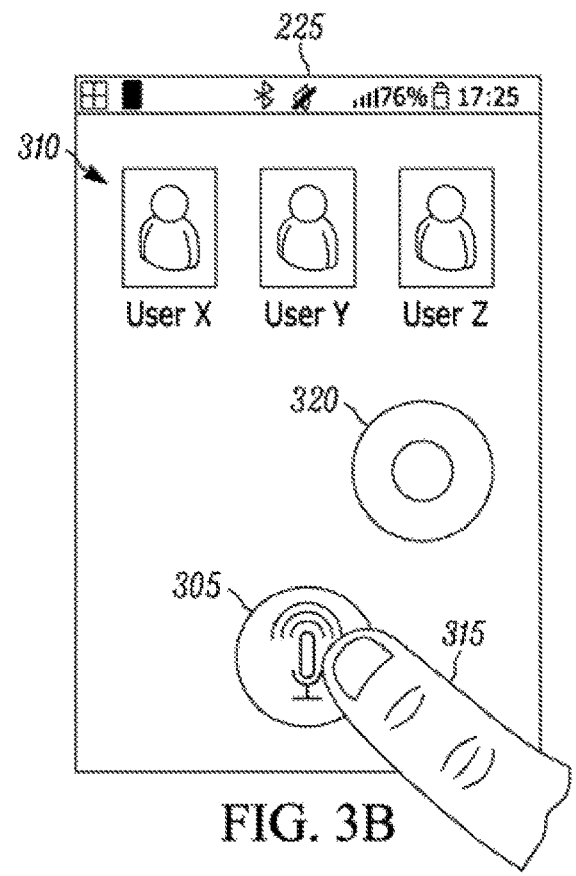
Figure 3C:
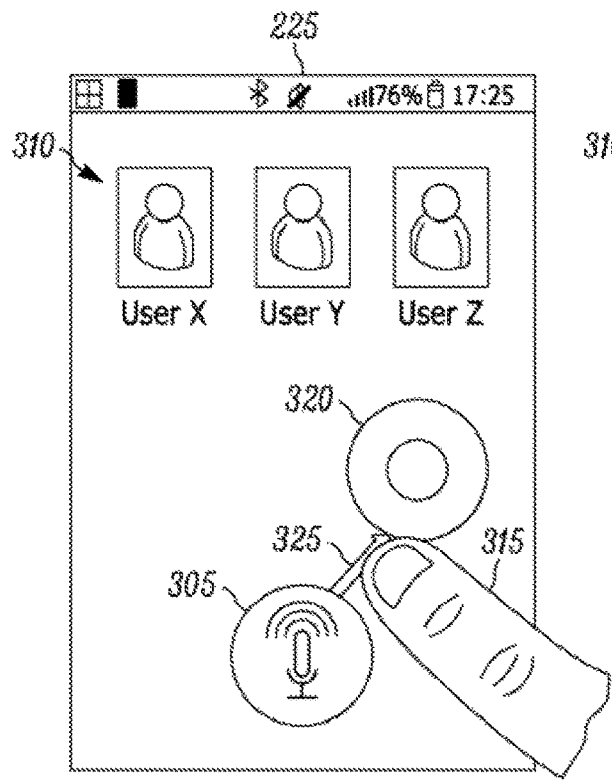
Figure 3D:
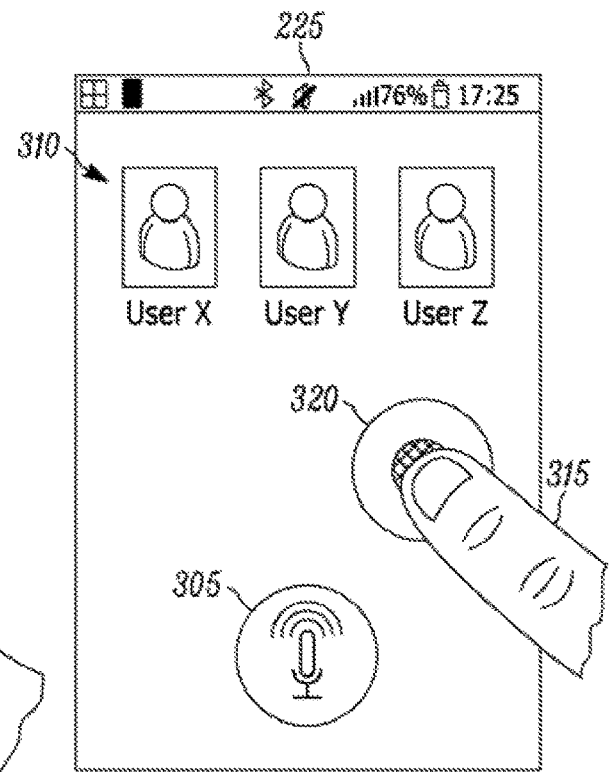

FIGS. 3A through 3D illustrate an exemplary series of screen shots of the touch-screen display 225, which are described in further detail with respect to FIG. 4 below. The touch-screen display 225 in FIG. 3A displays a push-to-talk button 305 in an unselected state and a plurality of icons 310. The plurality of icons 310 represent the individual members of a talk group of which the portable electronic device 105 (or a user of the portable electronic device 105) is a member. FIG. 3B illustrates the touch-screen display 225 having the push-to-talk button 305 in a selected state and a secondary feature button 320. FIG. 3C illustrates the touch-screen display 225 with a swipe motion 325 from the push-to-talk button 305 to the secondary feature button 320. FIG. 3D illustrates the user's finger 315 touching the secondary feature button 320 after performing the swipe motion 325.

Figure 4:
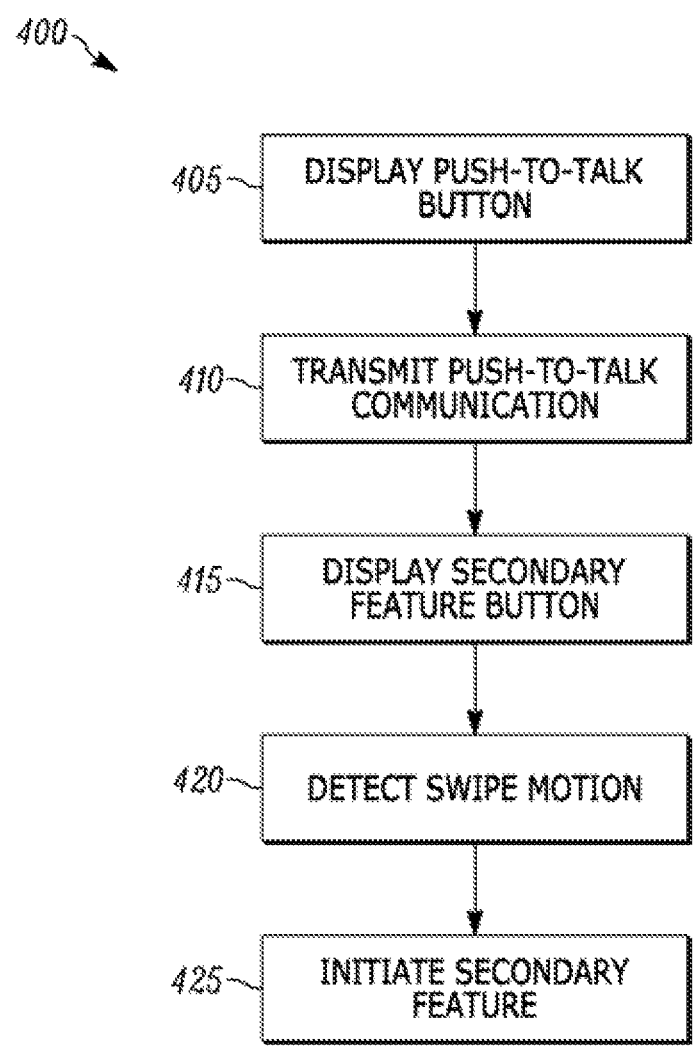
FIG. 4 is a flowchart of a method of controlling a secondary feature on a portable electronic device in accordance with some embodiments.

FIG. 4 illustrates an exemplary method 400 of controlling a secondary feature on the portable electronic device 105. In the example illustrated, the electronic processor 205 displays the push-to-talk button 305 on the touch-screen display 225 (at block 405). For example, the touch-screen display 225 of FIG. 3A displays the push-to-talk button 305, unselected.

The electronic processor 205 starts transmitting a push-to-talk communication (for example, an audio communication) via the transceiver 230 on a current operating channel to at least one other portable electronic device within the mobile communication network 110 when the push-to-talk button 305 is selected (at block 410). For example, the electronic processor 205 detects, based on signals received from the touch-screen display 225, when the user's finger 315 touches the push-to-talk button 305 on the touch-screen display 225, as illustrated in FIG. 3B, and transmits a push-to-talk communication to the plurality of other portable electronic devices 115 through 125. Additionally, the electronic processor 205 displays a secondary feature button 320 on the touch-screen display 225 while the push-to-talk button 305 remains selected (at block 415), as illustrated in FIG. 3B. In some embodiments, the visual appearance of the push-to-talk button 305 changes to indicate the transmission of push-to-talk communication (for example, through changes in color, shape, or both).

The electronic processor 205 detects a swipe motion 325 on the touch-screen display 225 from the push-to-talk button 305 to the secondary feature button 320 (at block 420). In some embodiments, the swipe motion 325 is a movement of the user's finger 315 between the location of the push-to-talk button 305 and the location of the secondary feature button 320 on the touch-screen display 225 without lifting the user's finger 315 off of the touch-screen display 225, as illustrated in FIG. 3C. As explained above, the electronic processor 205 receives signals from the touch-screen display 225 which indicate positions on the touch-screen display 225 currently being selected. In some embodiments, the electronic processor 205 detects the swipe motion 325 based on changes in the indicated positions over time. In other words, the electronic processor 205 tracks movement of the user's finger 315 and detects when the user's finger 315 moves from the push-to-talk button 305 to the secondary feature button 320 on the touch-screen display 225.

In response to detecting the swipe motion 325, the electronic processor 205 initiates the secondary feature while continuing to transmit the push-to-talk communication on the current operating channel (at block 425). In some embodiments, the visual appearance of the secondary feature button 320 changes to indicate the initiation of the secondary feature (for example, through changes in color, shape, or both). For example, FIG. 3D illustrates the secondary feature button 320 changing color to indicate the initiation of the secondary feature.

In some embodiments, the portable electronic device 105 stops transmitting push-to-talk communication when the touch-screen display 225 is unselected after the push-to-talk button 305 is selected. As an example, the portable electronic device 105 continues to transmit push-to-talk communication as long as the electronic processor 205 detects that the user's finger 315 maintains continuous physical contact with the touch-screen display 225 after the push-to-talk button 305 is selected. The portable electronic device 105 continues to transmit the push-to-talk communication even if the user's finger 315 moves away from the push-to-talk button 305 as long as the user's finger 315 maintains continuous physical contact with the touch-screen display 225.

Figure 5A:
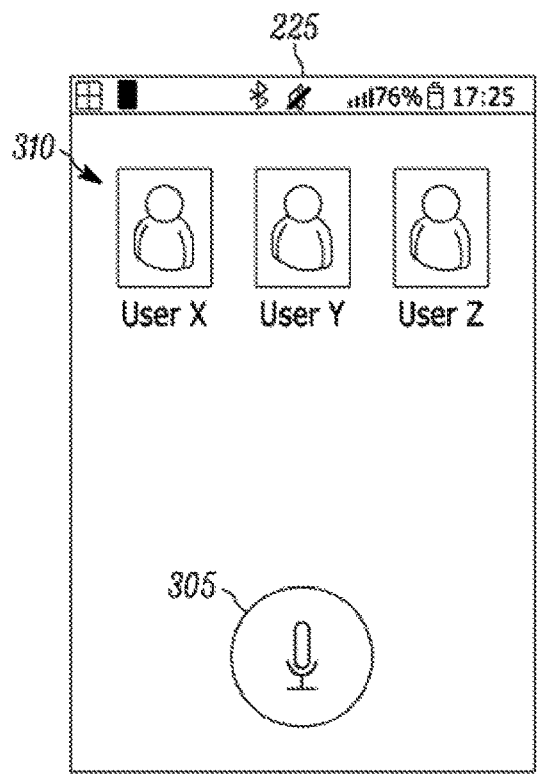
FIGS. 5A through 5D are exemplary screen shots of a touch-screen display including a record audio button.
Figure 5B:
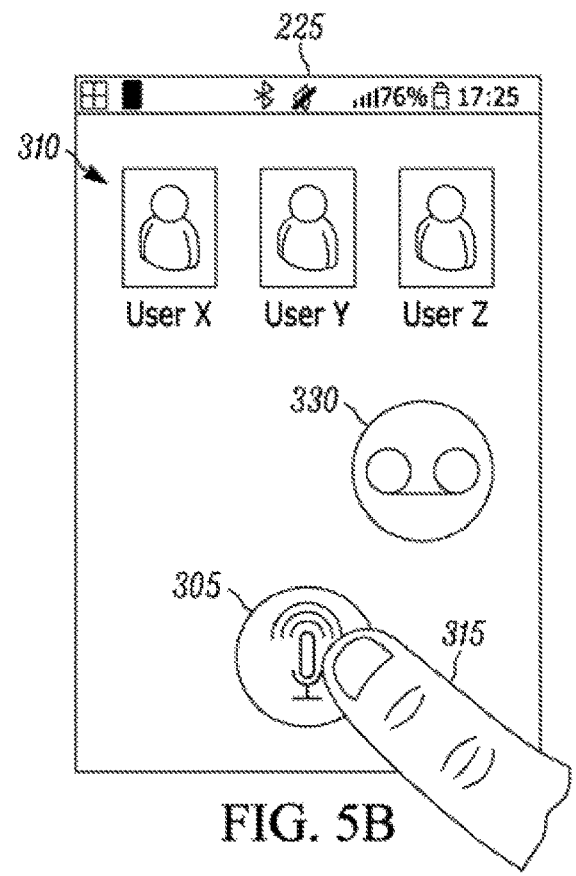
Figure 5C:
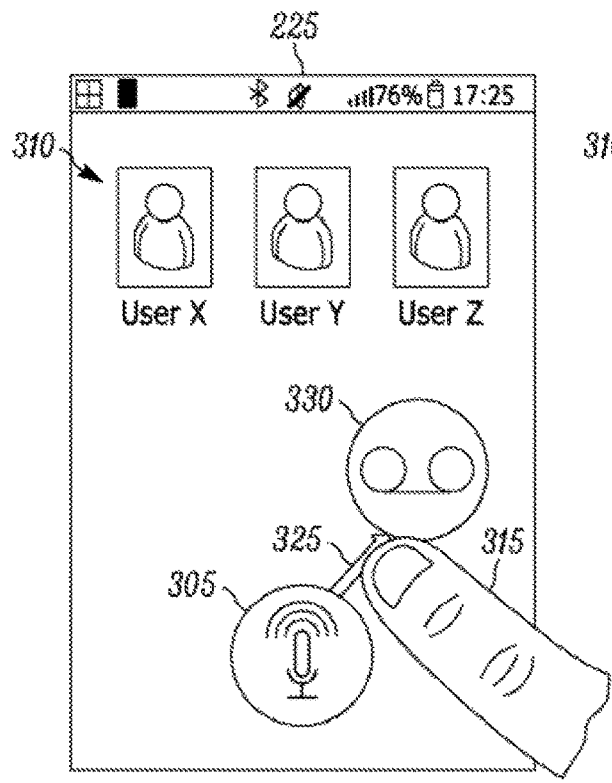
Figure 5D:
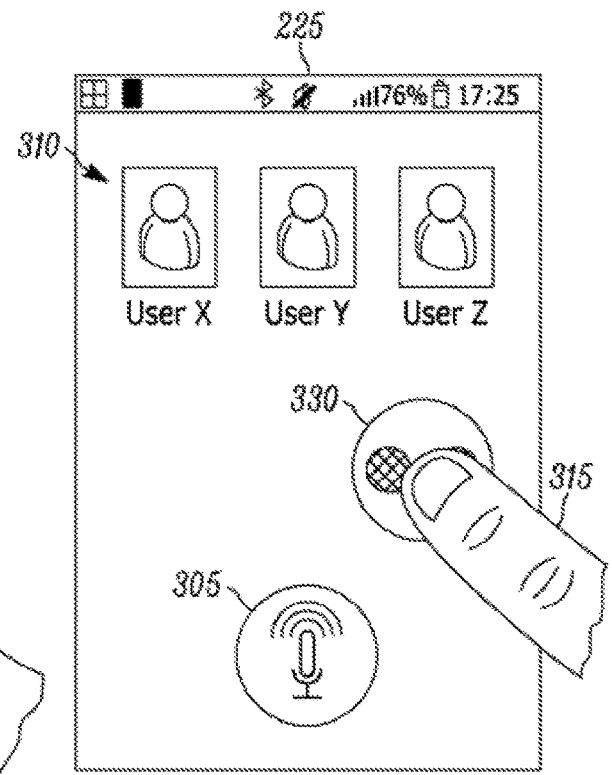

In some embodiments, as explained above, the secondary feature includes recording incoming audio communication that the portable electronic device 105 receives while transmitting push-to-talk communication. FIGS. 5A through 5D illustrate an exemplary series of screen shots of the touch-screen display 225 when the secondary feature button 320 is a record audio button 330. The touch-screen display 225 in FIG. 5A displays the push-to-talk button 305, which is not selected. The touch-screen display 225 displays the record audio button 330 when the push-to-talk button 305 is selected, as illustrated in FIG. 5B. The electronic processor 205 detects the swipe motion 325 to the record audio button 330 on the touch-screen display 225. For example, the electronic processor 205 detects, based on signals received from the touch-screen display 225, when the user's finger 315 moves from the push-to-talk button 305 to the record audio button 330 on the touch-screen display 225, as illustrated in FIG. 5C. FIG. 5D illustrates the user's finger 315 touching the record audio button 330 after performing the swipe motion 325.

Upon detecting the swipe motion 325, the electronic processor 205 starts recording audio. In some embodiments, the audio recorded includes audio communication on the current operating channel, audio communication on other operating channels (for example, a second operating channel), audio communication from cellular calls, audio communication from voice over internet protocol (VoIP) calls, and any combination or derivative thereof. The ability to capture audio on the current operating channel allows recording of the conversion for later access. In addition, the record audio secondary feature enables a push-to-talk call to continue to occur without missing other audio communication received by the portable electronic device 105. For example, the portable electronic device 105 records audio communication on a second operating channel while transmitting push-to-talk communication on the current operation channel of the portable electronic device 105. In some embodiments, the electronic processor 205 indicates that audio recording is in progress on the touch-screen display 225. For example, the visual appearance of the record audio button 330 changes to indicate that audio recording is in progress, as illustrated in FIG. 5D.

In some embodiments, the electronic processor 205 stores the audio data in the memory 210 to enable future access. For example, the electronic processor 205 outputs the audio data stored in the memory 210 using the speaker 220 after the current push-to-talk call is complete. Alternately or in addition, the electronic processor 205 may transmit the audio data via the transceiver 230 to another device for storage, playback, or both.

Figure 6A:
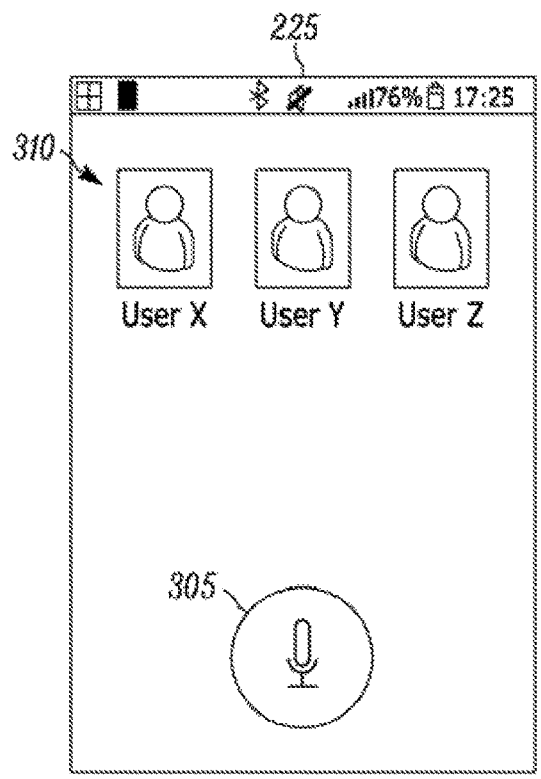
FIGS. 6A through 6D are exemplary screen shots of a touch-screen display including a transmit video button.
Figure 6B:
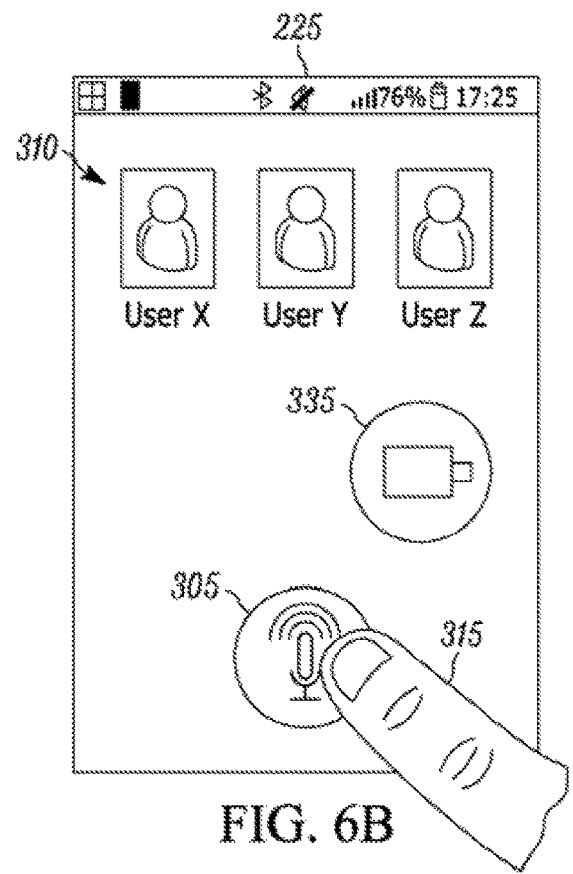
Figure 6C:
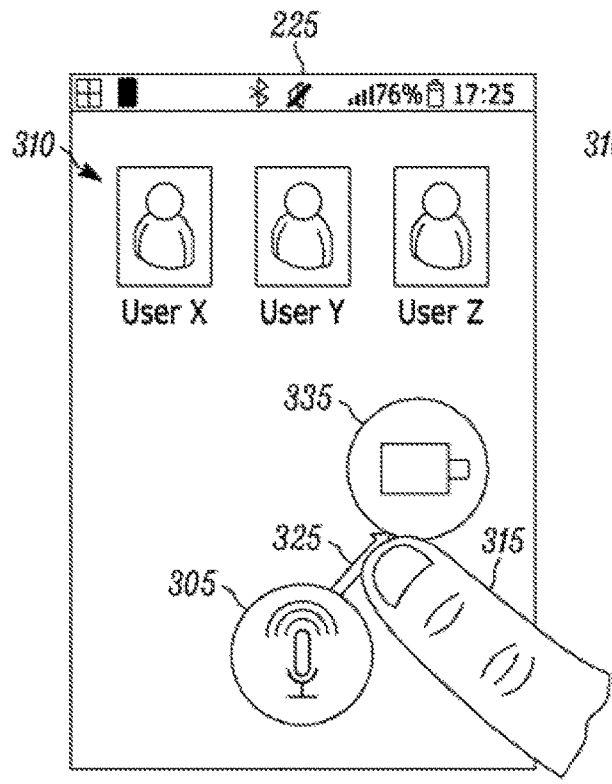
Figure 6D:
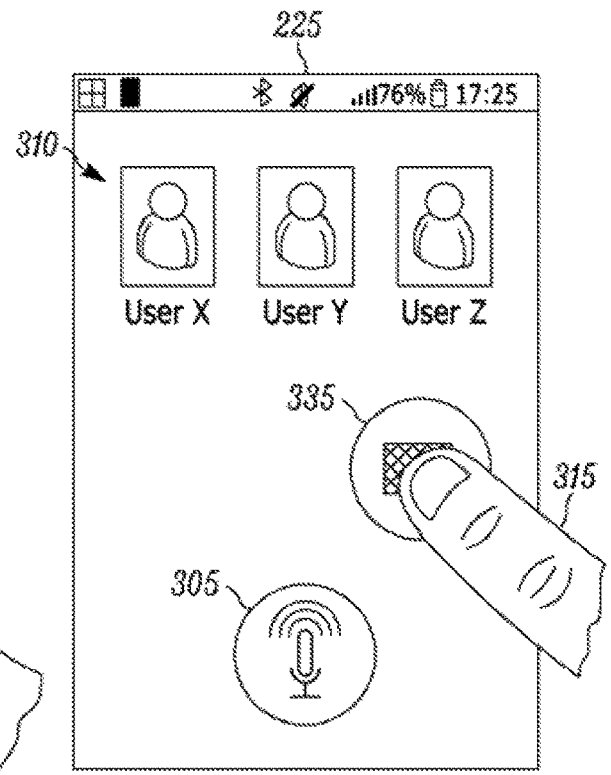

In some embodiments, the secondary feature includes transmitting video (for example, captured by the camera 235) along with audio in a push-to-talk communication. FIGS. 6A through 6D illustrate an exemplary series of screen shots of the touch-screen display 225 when the secondary feature button 320 is a transmit video button 335. The touch-screen display 225 in FIG. 6A displays the push-to-talk button 305, which is not selected. The touch-screen display 225 displays the transmit video button 335 when the push-to-talk button 305 is selected, as illustrated in FIG. 6B. The electronic processor 205 detects the swipe motion 325 to the transmit video button 335 on the touch-screen display 225. For example, the electronic processor 205 detects, based on signals received from the touch-screen display 225, when the user's finger 315 moves from the push-to-talk button 305 to the transmit video button 335 on the touch-screen display 225, as illustrated in FIG. 6C. FIG. 6D illustrates the user's finger 315 touching the transmit video button 335 after performing the swipe motion 325.

Upon detecting the swipe motion 325, the electronic processor 205 starts transmitting video along with audio in the push-to-talk communication. For example, the electronic processor 205 receives image data captured by the camera 235 and transmits the image data along with audio in the push-to-talk communication. The transmit video secondary feature provides an in-call transition from an in-progress audio push-to-talk communication to an audio and video push-to-talk communication. In some embodiments, the electronic processor 205 stores the image data in the memory 210 with or without the audio data from the corresponding push-to-talk communication. The stored image data can be later displayed via the touch-screen display 225 or transmitted via the transceiver 230 to another device for storage, playback, or both. The accompanying audio data may be output by the speaker 220 or transmitted along with the image data. In some embodiments, the electronic processor 205 indicates that video transmission is in progress on the touch-screen display 225. For example, the visual appearance of the transmit video button 335 changes to indicate that video transmission is in progress, as illustrated in FIG. 6D.

Figure 7A:
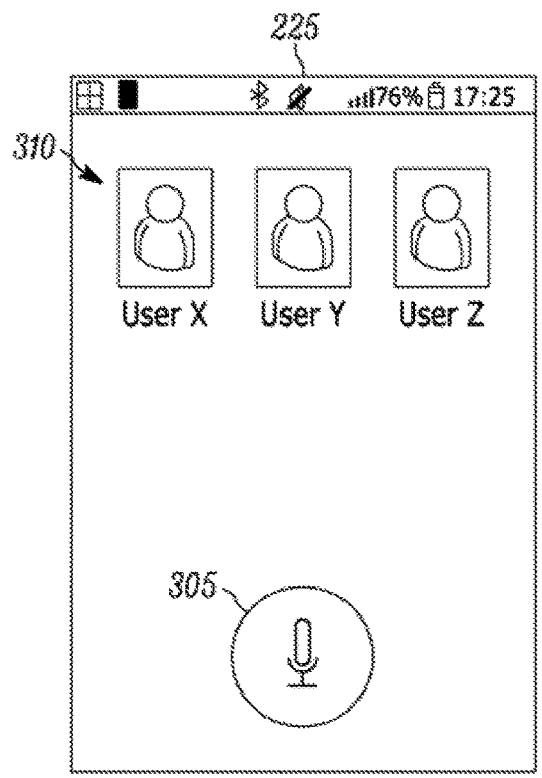
FIGS. 7A through 7D are exemplary screen shots of a touch-screen display including a covert mode button.
Figure 7B:
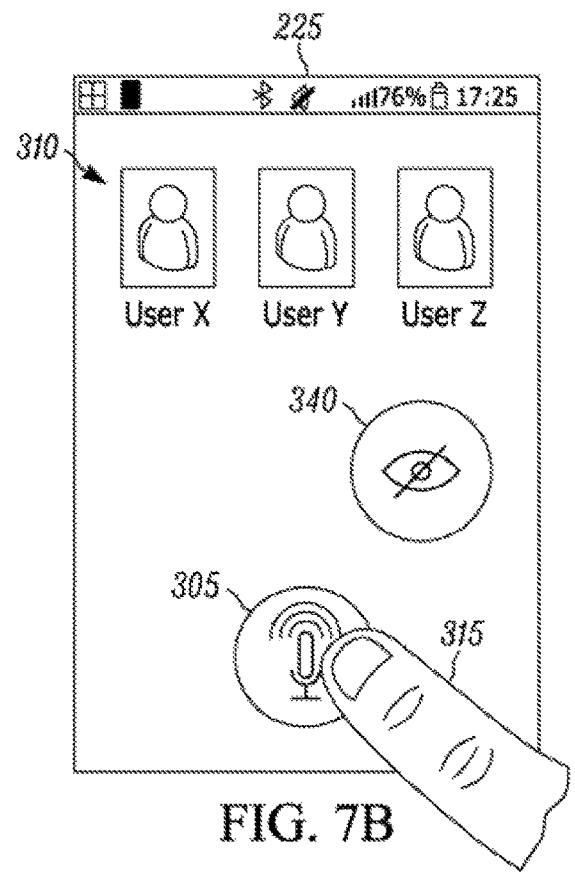
Figure 7C:
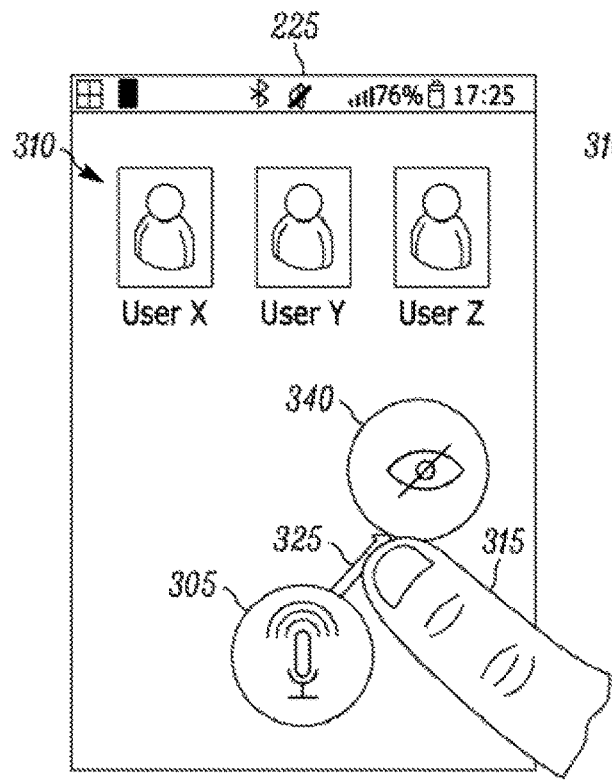
Figure 7D:
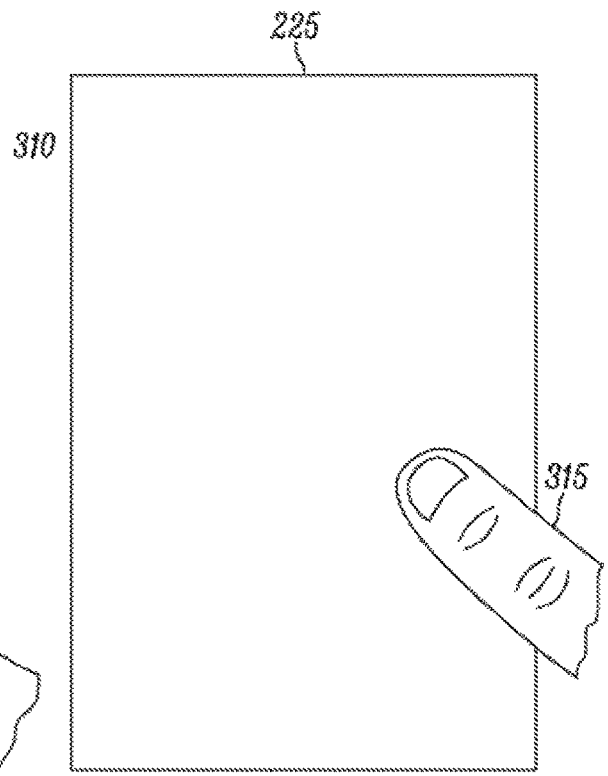

In some embodiments, the secondary feature includes a covert mode which enables increased privacy during push-to-talk communication. FIGS. 7A through 7D illustrate an exemplary series of screen shots of the touch-screen display 225 when the secondary feature button 320 is a covert mode button 340. The touch-screen display 225 in FIG. 7A displays the push-to-talk button 305, which is not selected. The touch-screen display 225 displays the covert mode button 340 when the push-to-talk button 305 is selected, as illustrated in FIG. 7B. The electronic processor 205 detects the swipe motion 325 to the covert mode button 340 on the touch-screen display 225. For example, the electronic processor 205 detects, based on signals received from the touch-screen display 225, when the user's finger 315 moves from the push-to-talk button 305 to the covert mode button 340 on the touch-screen display 225, as illustrated in FIG. 7C. FIG. 7D illustrates the user's finger 315 touching the covert mode button 340 after performing the swipe motion 325.

Upon detecting the swipe motion 325, the electronic processor 205 enters the covert mode. For example, the electronic processor 205 turns off the touch-screen display 225, as illustrated in FIG. 7D. However, the electronic processor 205 continues transmitting push-to-talk communication via the transceiver 230 as long as the electronic processor 205 detects that the user's finger 315 maintains continuous physical contact with the touch-screen display 225. Thus, the covert mode enables an in-progress push-to-talk communication to continue while the touch-screen display 225 is turned off. Turning off the touch-screen display 225 increases security during push-to-talk communication, for example, by preventing others from viewing information on the touch-screen display 225. In some embodiments, the covert mode is used in conjunction with the headset 245 to provide further privacy. As an example, upon entering the covert mode, the electronic processor 205 switches from using the microphone 215 and the speaker 220 to using the headset 245 to capture audio for transmitting push-to-talk communication, and to output audio in received push-to-talk communication.

Figure 8A:
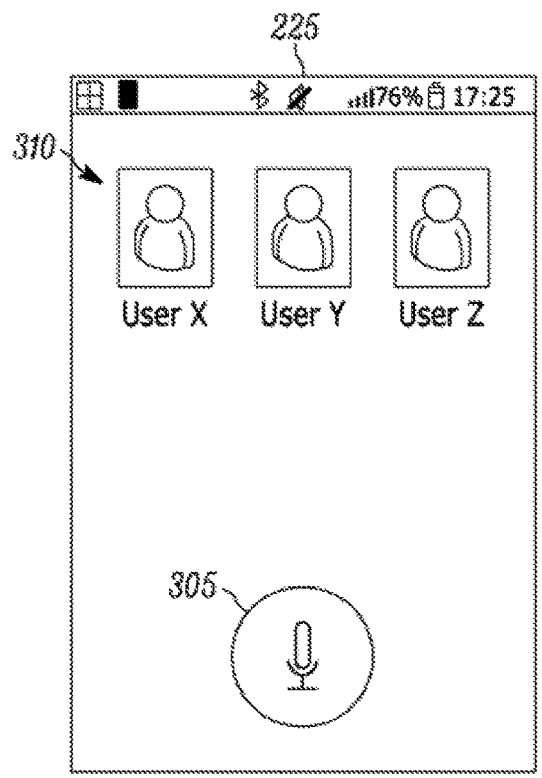
FIGS. 8A through 8D are exemplary screen shots of a touch-screen display including an emergency call button.
Figure 8B:
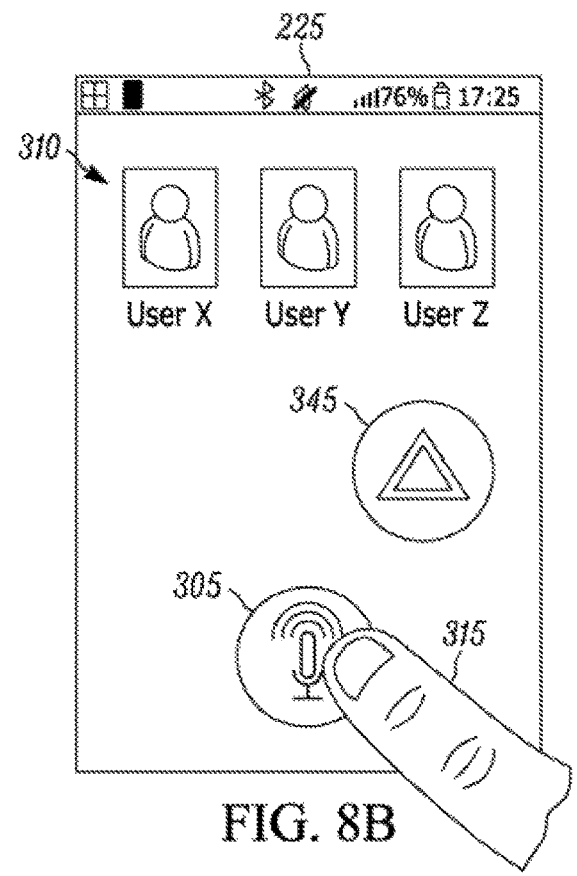
Figure 8C:
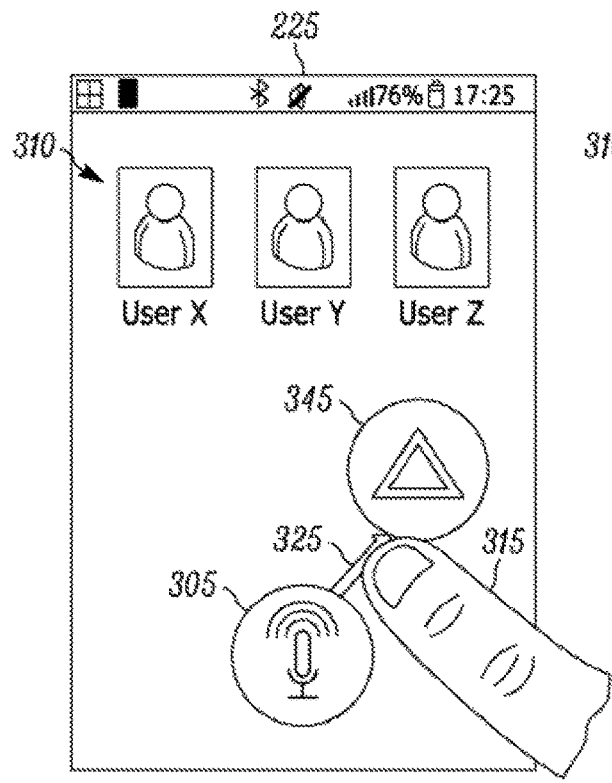
Figure 8D:
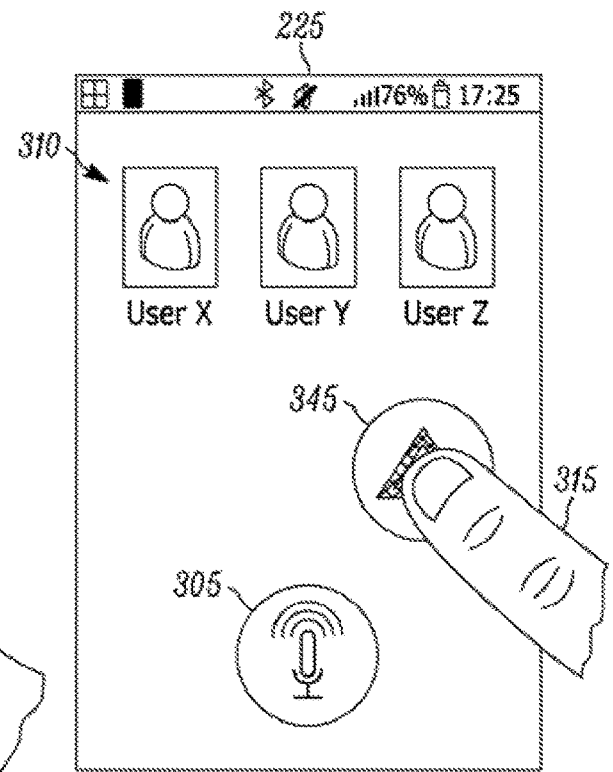

In some embodiments, the secondary feature includes switching to an emergency call. FIGS. 8A through 8D illustrate an exemplary series of screen shots of the touch-screen display 225 when the secondary feature button 320 is an emergency call button 345. The touch-screen display 225 in FIG. 8A displays the push-to-talk button 305, which is not selected. The touch-screen display 225 displays the emergency call button 345 when the push-to-talk button 305 is selected, as illustrated in FIG. 8B. The electronic processor 205 detects the swipe motion 325 to the emergency call button 345 on the touch-screen display 225. For example, the electronic processor 205 detects, based on signals received from the touch-screen display 225, when the user's finger 315 moves from the push-to-talk button 305 to the emergency call button 345 on the touch-screen display 225, as illustrated in FIG. 8C. FIG. 8D illustrates the user's finger 315 touching the emergency call button 345 after performing the swipe motion 325.

Upon detecting the swipe motion 325, the electronic processor 205 increases a call priority level of the current push-to-talk communication. In push-to-talk communications, generally, only one device is permitted to transmit at a time. Each device includes a call priority level that determines priority within a given operating channel. In other words, when two devices attempt to transmit on the same operating channel at the same time, the device with a higher call priority level is permitted to transmit first, and the device with a lower call priority level is not permitted to transmit until the device with the higher priority call level is finished transmitting. The emergency call secondary feature provides an in-call transition from an in-progress call (for example, a non-emergency call) to an emergency call in which the portable electronic device 105 is permitted to transmit push-to-talk communication on an operating channel regardless of whether another other device is currently transmitting or attempting to transmit push-to-talk communication on the same operating channel. In some embodiments, the electronic processor 205 indicates the switch to an emergency call on the touch-screen display 225. For example, the visual appearance of the emergency call button 345 changes to indicate that the call priority level has been increased, as illustrated in FIG. 8D.

Figure 9:
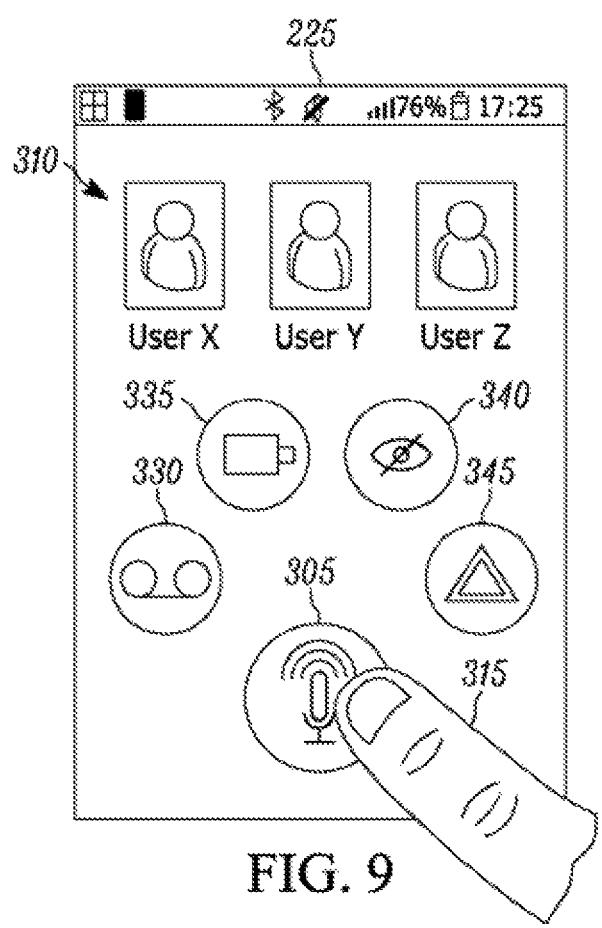
FIG. 9 is an exemplary screen shot of a touch-screen display including a plurality of secondary feature buttons.

In some embodiments, the portable electronic device 105 includes a plurality of secondary features. For example, FIG. 9 illustrates an exemplary screen shot of the touch-screen display 225 when the portable electronic device 105 includes all of the secondary features described herein. As illustrated in FIG. 9, the touch-screen display 225 displays the record audio button 330, the transmit video button 335, the covert mode button 340, and the emergency call button 345. Based on signals received from the touch-screen display 225, the electronic processor 205 detects a swipe motion from the push-to-talk button 305 to any of the four secondary feature buttons on the touch-screen display 225 and activates the corresponding secondary feature as described herein. In alternate embodiments, the portable electronic device 105 may include any combination of the secondary features described herein.

As explained above, the electronic processor 205 initiates a secondary feature in response to detecting the swipe motion 325 (for example, a first swipe motion) from the push-to-talk button 305 to the secondary feature button 320. In some embodiments, the electronic processor 205 stops a secondary feature when the touch-screen display 225 is unselected. As an example, the electronic processor 205 stops the secondary feature upon detecting, based on signals received from the touch-screen display 225, that the user's finger 315 is no longer touching the touch-screen display 225 (for example, when the user's finger 315 is lifted off of the touch-screen display 225). The portable electronic device 105 also stops transmitting push-to-talk communication when the touch-screen display 225 is unselected.

Alternatively or in addition, the electronic processor 205 stops a secondary feature when the secondary feature button 320 is unselected. As an example, the electronic processor 205 stops the secondary feature upon detecting, based on signals received from the touch-screen display 225, a second swipe motion on the touch-screen display 225 away from the secondary feature button 320. In some embodiments, the second swipe motion is a movement of the user's finger 315 away from the location of the secondary feature button 320 while maintaining continuous physical contact with the touch-screen display 225. Although the secondary feature may be stopped upon the second swipe motion, the portable electronic device 105 continues to transmit push-to-talk communication as long as the touch-screen display 225 is still selected.

Alternatively or in addition, the portable electronic device 105 stops transmitting push-to-talk communication when the electronic processor 205 detects that the secondary feature button 320 or the touch-screen display 225 is unselected. However, the electronic processor 205 does not stop the secondary feature until a separate action occurs. For example, while in the covert mode, the portable electronic device 105 stops transmitting push-to-talk communication in response to the electronic processor 205 detecting the second swipe motion, but does not turn the touch-screen display 225 back on (i.e., stays in the covert mode). In some embodiments, the electronic processor 205 turns the touch-screen display 225 back on (i.e., exits the covert mode) in response to the push button 240 being selected. For example, the electronic processor 205 turns the touch-screen display 225 back on upon receiving an electrical signal from the push button 240 indicating that the push button 240 is being selected.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable electronic device that communicates with other portable electronic devices within a mobile communication network, the portable electronic device comprising:
    a transceiver configured to transmit and receive audio data over a half-duplex operating channel;
    a touch-screen display displaying a push-to-talk button; and
    an electronic processor electrically coupled to the transceiver and the touch-screen display, the electronic processor configured to
        start transmitting a push-to-talk communication via the transceiver on a current operating channel to at least one other portable electronic device within the mobile communication network when the push-to-talk button is selected, display a secondary feature button on the touch-screen display while the push-to-talk button remains selected, detect a swipe motion on the touch-screen display from the push-to-talk button to the secondary feature button, initiate a secondary feature, in response to the swipe motion being detected, while continuing to transmit the push-to-talk communication on the current operating channel, and stop transmitting the push-to-talk communication when the touch-screen display is unselected after the push-to-talk button is selected.

2. The portable electronic device of claim 1, wherein the swipe motion is a first swipe motion, wherein the electronic processor is further configured to detect a second swipe motion on the touch-screen display away from the secondary feature button, and stop the secondary feature when the second swipe motion is detected.

3. The portable electronic device of claim 1, wherein the secondary feature button is a record audio button, and initiating the secondary feature includes starting recording of audio.

4. The portable electronic device of claim 3, wherein the electronic processor is further configured to indicate that recording is in progress on the touch-screen display when the swipe motion is detected.

5. The portable electronic device of claim 3, wherein the audio recorded includes audio communication from at least one selected from a group consisting of the current operating channel and a second operating channel.

6. The portable electronic device of claim 1, further comprising a camera electrically coupled to the electronic processor, wherein the secondary feature button is a transmit video button, and initiating the secondary feature includes starting transmitting of video captured by the camera.

7. The portable electronic device of claim 1, wherein the secondary feature button is a covert mode button, and initiating the secondary feature includes turning off the touch-screen display.

8. The portable electronic device of claim 7, wherein the electronic processor is further configured to switch from a speaker to a headset when initiating the secondary feature.

9. The portable electronic device of claim 1, wherein the secondary feature button is an emergency call button, and initiating the secondary feature includes increasing a call priority level.

10. A method of controlling a secondary feature on a portable electronic device that communicates with other portable electronic devices within a mobile communication network, the method comprising:

transmitting and receiving audio data over a half-duplex operating channel via a transceiver of the portable electronic device;

displaying a push-to-talk button on a touch-screen display of the portable electronic device;

starting transmitting a push-to-talk communication via the transceiver of the portable electronic device on a current operating channel to at least one other portable electronic device within the mobile communication network when the push-to-talk button is selected;

displaying a secondary feature button on the touch-screen display while the push-to-talk button remains selected;

detecting a swipe motion on the touch-screen display from the push-to-talk button to the secondary feature button;

initiating the secondary feature, in response to the swipe motion being detected, while continuing to transmit the push-to-talk communication on the current operating channel; and stopping transmitting the push-to-talk communication when the touch-screen display is unselected after the push-to-talk button is selected.

11. The method of claim 10, further comprising:

detecting a second swipe motion on the touch-screen display away from the secondary feature button; and stopping the secondary feature when the second swipe motion is detected.

12. The method of claim 10, wherein the secondary feature button is a record button, and initiating the secondary feature includes starting recording of audio.

13. The method of claim 12, further comprising indicating that recording is in progress on the touch-screen display when the swipe motion is detected.

14. The method of claim 12, wherein the audio recorded includes audio communication from at least one selected from a group consisting of the current operating channel and a second operating channel.

15. The method of claim 10, wherein the secondary feature button is a transmit video button, and initiating the secondary feature includes starting transmitting of video captured by a camera of the portable electronic device.

16. The method of claim 10, wherein the secondary feature button is a covert mode button, and initiating the secondary feature includes turning off the touch-screen display.

17. The method of claim 16, further comprising switching from a speaker of the portable electronic device to a headset when initiating the secondary feature.

18. The method of claim 10, wherein the secondary feature button is an emergency call button, and initiating the secondary feature includes increasing a call priority level.

* * * * *